(12) United States Patent
Tabata et al.

(10) Patent No.: US 11,456,626 B2
(45) Date of Patent: Sep. 27, 2022

(54) POWER TRANSFER DEVICE

(71) Applicant: OMRON Corporation, Kyoto (JP)

(72) Inventors: Kenichi Tabata, Ichinomiya (JP); Goro Nakao, Inazawa (JP); Yusuke Kawai, Ichinomiya (JP); Atsushi Nomura, Ichinomiya (JP); Masanobu Nakajo, Nagoya (JP); Takahiro Takeyama, Ichinomiya (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/429,646

(22) PCT Filed: Mar. 2, 2020

(86) PCT No.: PCT/JP2020/008757
§ 371 (c)(1),
(2) Date: Aug. 10, 2021

(87) PCT Pub. No.: WO2020/195587
PCT Pub. Date: Oct. 1, 2020

(65) Prior Publication Data
US 2022/0216736 A1 Jul. 7, 2022

(30) Foreign Application Priority Data

Mar. 25, 2019 (JP) .............................. JP2019-057242

(51) Int. Cl.
*H02J 50/70* (2016.01)
*H02J 50/12* (2016.01)
(52) U.S. Cl.
CPC .............. *H02J 50/70* (2016.02); *H02J 50/12* (2016.02)

(58) Field of Classification Search
None
See application file for complete search history.

(56) References Cited

U.S. PATENT DOCUMENTS

| 2017/0063155 A1 | 3/2017 | Nishikawa et al. |
| 2017/0214276 A1 | 7/2017 | Boys et al. |

(Continued)

FOREIGN PATENT DOCUMENTS

| JP | 2017-5850 A | 1/2017 |
| JP | 2017-46423 A | 3/2017 |

(Continued)

OTHER PUBLICATIONS

An English translation of the International Search Report ("ISR") of PCT/JP2020/008757 dated Mar. 31, 2020.

(Continued)

*Primary Examiner* — Adi Amrany
(74) *Attorney, Agent, or Firm* — Metrolex IP Law Group, PLLC

(57) ABSTRACT

A power transfer device includes a power transfer coil that transfers power to another device in a non-contact manner, a power transmission and reception circuit that supplies power to the power transfer coil or outputs power received by the power transfer coil to a load circuit, and a protection coil disposed between the power transfer coil and the power transmission and reception circuit to prevent a magnetic flux generated by the power transfer coil from reaching the power transmission and reception circuit. The protection coil includes an air-core coil formed of a wiring pattern of a conductor provided on a board disposed between the power transfer coil and the power transmission and reception circuit, and at least one core coil connected in series to the air-core coil.

2 Claims, 6 Drawing Sheets

(56) References Cited

U.S. PATENT DOCUMENTS

| | | | |
|---|---|---|---|
| 2017/0222490 A1 | 8/2017 | Boys et al. | |
| 2018/0082782 A1* | 3/2018 | Naruse | H02J 50/12 |
| 2019/0173325 A1 | 6/2019 | Ichikawa | |

FOREIGN PATENT DOCUMENTS

| | | |
|---|---|---|
| JP | 2017-195693 A | 10/2017 |
| JP | 2017-530562 A | 10/2017 |
| JP | 2017-204576 A | 11/2017 |

OTHER PUBLICATIONS

The Written Opinion("WO") of PCT/JP2020/008757 dated Mar. 31, 2020.

* cited by examiner

POWER TRANSFER DEVICE

TECHNICAL FIELD

The disclosure relates to a power transfer device that transfers power in a non-contact manner.

BACKGROUND ART

Research has been conducted on a so-called non-contact power feeding (also called wireless power transfer) technology of transmitting power across space without using metal contacts or the like.

In a power feeding device using a non-contact power feeding technology (hereinafter, simply referred to as a non-contact power feeding device), a resonance circuit including a secondary-side (power receiver-side) coil resonates with a current flowing through a primary-side (power transmitter-side) coil to transfer power. During the power transfer, a magnetic flux is generated by either the current flowing through the power transmitter-side coil or a current flowing through the power receiver-side coil. Given these circumstances, proposed is a technology for reducing leakage of the generated magnetic flux to the surroundings of the coils (see, for example, Patent Document 1).

For example, Patent Document 1 proposes an inductive power transfer flux coupling device configured to generate or receive a magnetic coupling flux in a flux coupling region and including a first coil disposed in a first layer and a second coil, at least part of the second coil being disposed in a second layer and configured to generate a magnetic flux that reflects a magnetic flux from the first coil.

PRIOR ART DOCUMENT

Patent Document 1: Japanese Unexamined Patent Publication No. 2017-530562

SUMMARY

Under the technology disclosed in Patent Document 1, however, when a magnetic flux interlinked with part of the second coil that generates a magnetic flux reflecting a magnetic flux from the first coil increases, a loss incurred in the part of the second coil becomes too large, which may cause the part of the second coil to generate heat.

It is therefore a power transfer device according to one or more embodiments is disclosed that may be capable of reducing a loss incurred in a protection coil provided to cut off a magnetic flux traveling from a coil for use in power transfer.

A power transfer device according to one or more embodiments may include a power transfer coil configured to transfer power to another device in a non-contact manner, a power transmission and reception circuit configured to supply power to the power transfer coil or to output power received by the power transfer coil to a load circuit, and a protection coil disposed between the power transfer coil and the power transmission and reception circuit to prevent a magnetic flux generated by the power transfer coil from reaching the power transmission and reception circuit. The protection coil may include an air-core coil formed of a wiring pattern of a conductor provided on a board disposed between the power transfer coil and the power transmission and reception circuit, and at least one core coil connected in series to the air-core coil.

Such a structure may allow the power transfer device according to one or more embodiments to reduce a loss incurred in the protection coil configured to cut off a magnetic flux travelling from the power transfer coil.

In a power transfer device, it may be preferable that at least one core coil of a protection coil is disposed inside a air-core coil wound on the board.

This may allow the outer diameter of the air-core coil to be determined without depending on the core coil and thus may allow an increase in diameter of the air-core coil with each. This in turn may allow the protection coil to be easily disposed such that the outer diameter of the power transfer coil falls within the outer diameter of the air-core coil as viewed from the power transmission and reception circuit, and as a result, the protection coil may prevent a magnetic flux travelling from the power transfer coil from reaching the power transmission and reception circuit.

Hereinafter, a non-contact power feeding device including a power transfer device according to one or more embodiments will be described with reference to the drawings. In this non-contact power feeding device, a power receiver-side device (hereinafter, simply referred to as a power receiver device), which is an example of the power transfer device, may include a protection coil provided between a receiver coil that receives power from a power transmitter-side device (hereinafter, simply referred to as a power transmitter device) and a board populated with a power receiver circuit including a capacitor, the capacitor and the receiver coil making up a resonance circuit, a rectifying circuit that rectifies the power thus received, and the like, the protection coil being configured to cut off a magnetic flux traveling from the receiver coil. The protection coil may include an air-core coil formed of a wiring pattern of a conductor on a board different from the board populated with the power receiver circuit, and a core coil connected in series to the air-core coil. As described above, the non-contact power feeding device having a structure where the air-core coil is formed of a pattern on the board to avoid an increase in size of the protection coil, and the core coil is connected to the air-core coil to make the self-inductance of the protection coil larger, so as to reduce a loss incurred in the protection coil.

Figure 1:
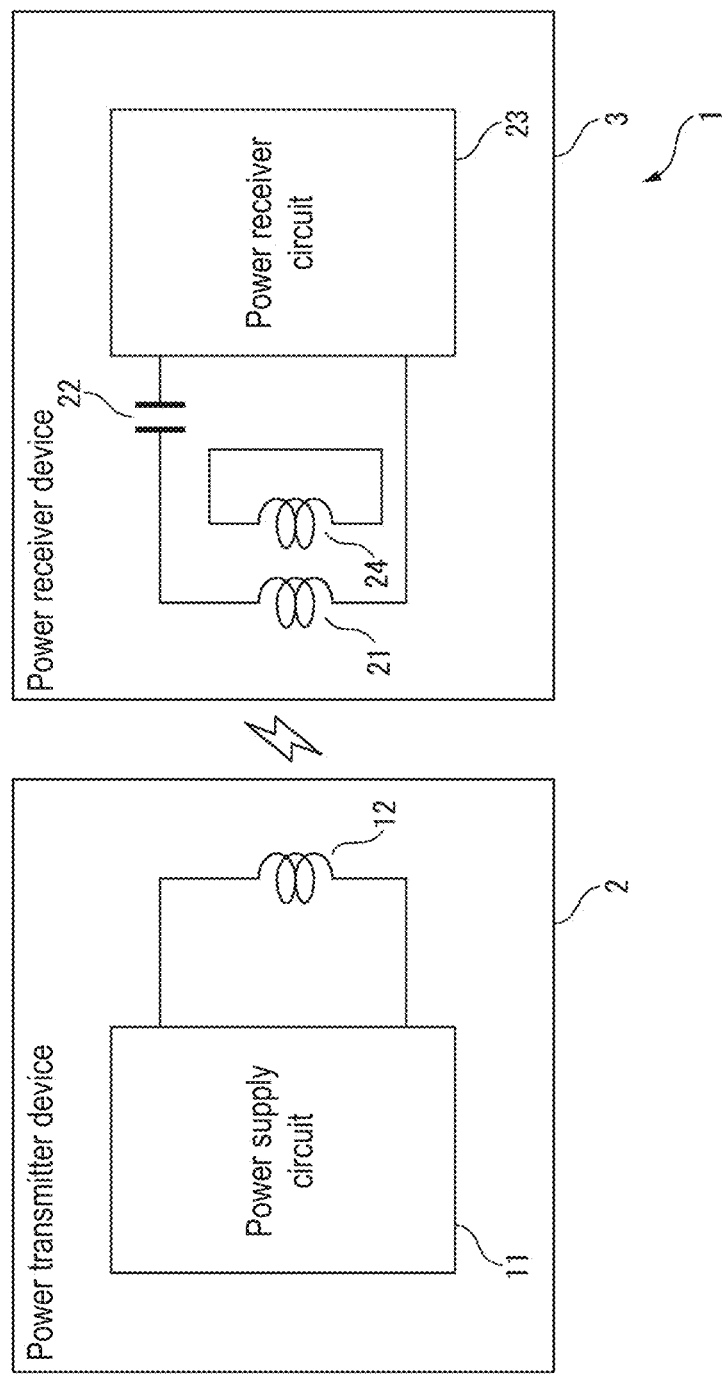
FIG. 1 is a diagram illustrating a schematic structure of a non-contact power feeding device including a power transfer device according to one or more embodiments.

FIG. 1 is a schematic structure diagram of the non-contact power feeding device including the power transfer device according to one or more embodiments. As shown in FIG. 1, the non-contact power feeding device 1 includes a power transmitter device 2 and a power receiver device 3 to which the power transmitter device 2 transmits power across space in a non-contact manner. The power transmitter device 2 includes a power supply circuit 11 and a transmitter coil 12. On the other hand, the power receiver device 3 includes a receiver coil 21, a resonance capacitor 22, a power receiver circuit 23, and a protection coil 24. The non-contact power feeding device 1 may be, for example, of a so-called primary series, secondary series resonance capacitor type (SS type) or a primary series, secondary parallel resonance capacitor type (SP type). Alternatively, the non-contact power feeding device 1 may be of a type in which the receiver coil and the resonance capacitor resonate in series on the secondary side without using resonance on the primary side (NS type) or a type in which the receiver coil and the resonance capacitor resonate in parallel on the secondary side without using resonance on the primary side (NP type).

First, a description will be given of the power transmitter device 2.

The power supply circuit 11 supplies AC power to the transmitter coil 12. It is therefore required that the power supply circuit 11 include, for example, a DC power supply that supplies DC power, an inverter circuit that converts the DC power supplied from the DC power supply to AC power and supplies the AC power to the transmitter coil 12, and a control circuit that controls the inverter circuit. The inverter circuit may be a full-bridge inverter having four switching elements (for example, MOSFETs) connected in a full-bridge configuration, or may be a half-bridge inverter having two switching elements connected in a half-bridge configuration. The control circuit controls switching of each switching element of the inverter circuit to an on or off state to make a frequency of the AC power supplied to the transmitter coil 12 equal to a predetermined frequency (for example, a resonance frequency of a resonance circuit of the power receiver device 3). The power supply circuit 11 may further include a DC-DC converter between the DC power supply and the inverter circuit. Alternatively, instead of the DC power supply, the power supply circuit 11 may include a rectifying circuit that is connected to an AC power supply and rectifies AC power from the AC power supply, and a power factor correction circuit that is connected to the rectifying circuit and converts pulsating power output from the rectifying circuit to DC power. In such a structure, the control circuit may control, in order to keep the voltage of the power received by the power receiver device 3 constant, the power factor correction circuit to adjust the voltage of the DC power supplied to the inverter circuit, for example.

Then, the transmitter coil 12 transmits the AC power supplied from the power supply circuit 11 to the receiver coil 21 of the power receiver device 3 across space. Note that the power transmitter device 2 may include a capacitor connected in series to the transmitter coil 12 between the transmitter coil 12 and the inverter circuit of the power supply circuit 11. The capacitor may be used for cutting off the DC power, or may serve as a component of the resonance circuit that resonates with the transmitter coil 12 at the frequency of the AC power supplied to the transmitter coil 12.

Note that the power transmitter device 2 may further include a communicator that receives a signal representing a power receiving state of the power receiver device 3. This allows the control circuit of the power supply circuit 11 to change the timing of the switching of each switching element of the inverter circuit to the on or off state so as to change the frequency of the AC power supplied to the transmitter coil 12 in accordance with to the power receiving state.

Next, a description will be given of the power receiver device 3 which is an example of the power transfer device.

The receiver coil 21 is an example of the power transfer coil, and the receiver coil 21 and the resonance capacitor 22 make up a resonance circuit. The receiver coil 21 resonates with an alternating current flowing through the transmitter coil 12 of the power transmitter device 2 to receive power from the transmitter coil 12. For this purpose, the resonance capacitor 22 may be connected in series or parallel to the receiver coil 21. Then, the AC power output from the resonance circuit made up of the receiver coil 21 and the resonance capacitor 22 is output to the power receiver circuit 23. Note that the receiver coil 21 and the transmitter coil 12 may be the same or different in the number of turns.

The power receiver circuit 23 is an example of a power transmission and reception circuit, and the power receiver circuit 23 converts the AC power from the resonance circuit made up of the receiver coil 21 and the resonance capacitor 22 to DC power and outputs the DC power to the load circuit (not shown) connected to the power receiver circuit 23. It is therefore required that the power receiver circuit 23 include, for example, a full-wave rectifying circuit that converts the AC power from the resonance circuit to pulsating power, and a smoothing capacitor that smooths the pulsating power output from the full-wave rectifying circuit and outputs the power thus smoothed to the load circuit. The power receiver circuit 23 may further include a voltmeter for use in measuring a voltage output to the load circuit, a communicator for use in transmitting, to the power transmitter device 2, the signal representing the power receiving state such as a voltage measured by the voltmeter, a switching element for use in switching from connection to disconnection, and vice versa between the load circuit and the power receiver circuit 23, a control circuit that controls switching of the switching element to the on or off state, and the like.

The protection coil 24 cuts off a magnetic flux travelling from the receiver coil 21 to prevent the magnetic flux from reaching the power receiver circuit 23.

Figure 2:
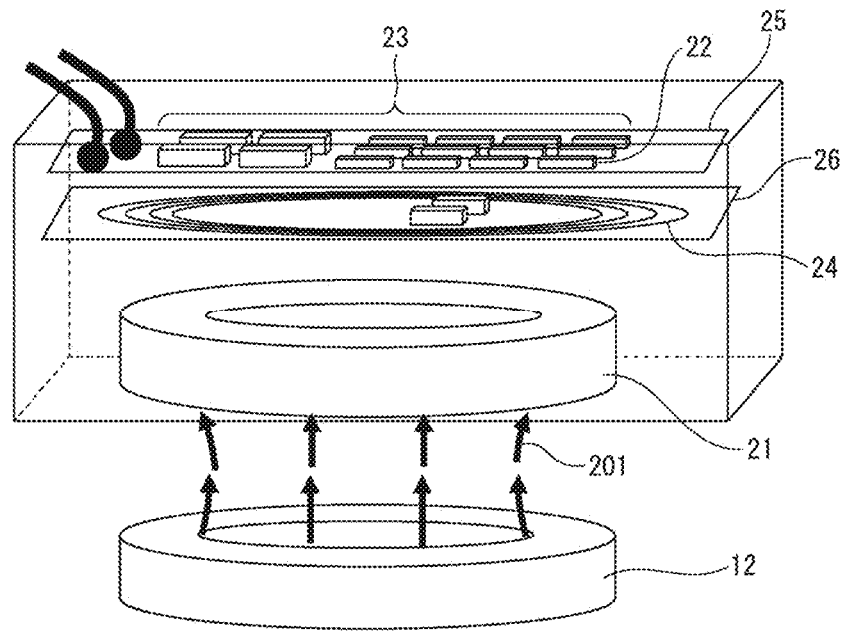
FIG. 2 is a diagram illustrating an example of arrangement of a receiver coil and a protection coil.
Figure 3:
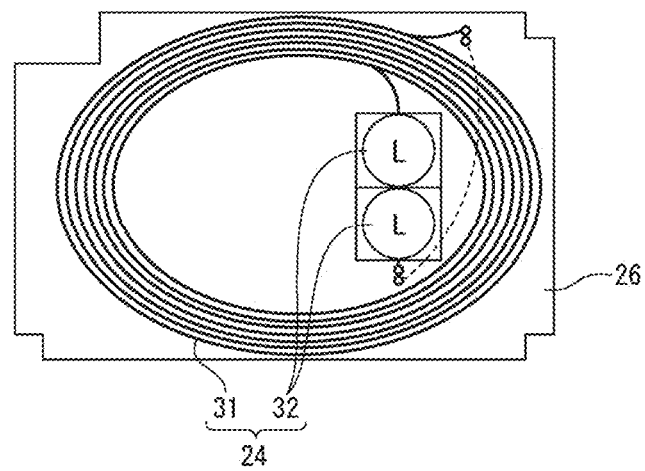
FIG. 3 is a diagram illustrating a schematic plan view of a protection coil.

FIG. 2 is a diagram showing an example of arrangement of the receiver coil 21 and the protection coil 24. Further, FIG. 3 is a schematic plan view of the protection coil 24. Furthermore, FIG. 4 is a circuit diagram of the protection coil 24.

As shown in FIG. 2, the protection coil 24 is provided on a board 26 disposed between the receiver coil 21 and a circuit board 25 populated with the resonance capacitor 22 and the power receiver circuit 23. That is, when the power transmitter device 2 and the power receiver device 3 are in a positional relationship where power transfer from the power transmitter device 2 to the power receiver device 3 is enabled as indicated by arrows 201, the protection coil 24 is located adjacent to a side of the receiver coil 21 remote from the transmitter coil 12. Then, the protection coil 24 is disposed to have its center axis approximately parallel with the center axis of the receiver coil 21. This causes the protection coil 24 to generate, in response to the magnetic flux travelling from the receiver coil 21, a current flowing in the opposite direction of the magnetic flux in accordance with the Lenz's law. As a result, the protection coil 24 cuts off the magnetic flux travelling from the receiver coil 21 using a magnetic field created by the current thus generated to prevent the magnetic flux from reaching the circuit board 25. Accordingly, the presence of the protection coil 24 allows a space between the receiver coil 21 and the circuit board 25 to be narrowed. This in turn allows the power receiver device 3 to be downsized. Both the circuit board 25 and the board 26 may be made of an insulator.

Figure 4:
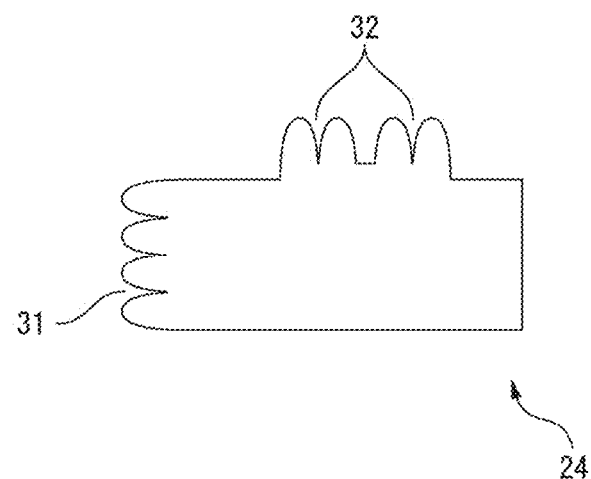
FIG. 4 is a circuit diagram illustrating a protection coil.

As shown in FIGS. 3 and 4, the protection coil 24 is provided on the board 26, and includes an air-core coil 31 and at least one core coil 32 connected in series to the air-core coil 31. Note that, in the example shown in FIGS. 3 and 4, the protection coil 24 includes two core coils 32 connected in series, but the number of core coils 32 is not limited to two, and may be one or three or more.

The air-core coil 31 has no core and is formed of a wiring pattern of a conductor provided on the board 26. The air-core coil 31 is provided to make its center axis approximately parallel with the center axis of the receiver coil 21. Furthermore, it may be preferable that the diameter of the air-core coil 31 in a plane orthogonal to the center axis of the air-core coil 31 is preferably larger than the diameter of the receiver coil 21 in a plane orthogonal to the center axis of the receiver coil 21. Furthermore, it may be preferable that the air-core coil 31 is disposed such that the outer diameter of the receiver coil 21 falls within the outer diameter of the air-core coil 31 as viewed from the circuit board 25 in the vertical direction. This may allow the air-core coil 31 to satisfactorily cut off the magnetic flux travelling from the receiver coil 21 to prevent the magnetic flux from reaching the circuit board 25.

The core coil 32 is connected in series to the air-core coil 31 and is disposed on the board 26. The core coil 32 is a coil wound around a core. This may allow the core coil 32 to be larger in self-inductance than the air-core coil 31 without a large number of turns. Therefore, the structure where the protection coil 24 includes the core coil 32 connected in series to the air-core coil 31 may make the self-inductance large as compared with a structure where the protection coil 24 includes no core coil 32. This in turn reduces a loss incurred in the protection coil 24 by the magnetic flux travelling from the receiver coil 21.

A loss W incurred in a coil by a magnetic flux interlinked with the coil is given by the following equation.

[Math. 1]

$$W = i^2 R = \frac{N^2 R}{L^2} \phi^2 \quad (1)$$

Herein, i denotes a current flowing through the coil, and R denotes a winding resistance of the coil. N denotes the number of turns of the coil, L denotes the self-inductance of the coil, and φ denotes the magnitude of the magnetic flux interlinked with the coil. As is apparent from the equation (1), the larger the self-inductance L, the smaller the loss W. Therefore, a loss in the protection coil made up of only the air-core coil is determined based on the self-inductance of the air-core coil itself. It is, however, required that the air-core coil have a larger number of turns in order to make the self-inductance larger. Therefore, in order to reduce the loss, the protection coil becomes large in size. Furthermore, when the number of turns increases, it is difficult to form the air-core coil of the wiring pattern of the conductor on the board as in the above-described embodiment.

On the other hand, according to the embodiment, the protection coil 24 includes at least one core coil 32 connected in series to the air-core coil 31. Accordingly, the self-inductance L in the equation (1) is a sum (La+Lcsum) of self-inductance La of the air-core coil 31 and a sum Lcsum of self-inductance of each core coil 32. Therefore, a loss incurred in the protection coil 24 according to the embodiment by the magnetic flux travelling from the receiver coil 21 is reduced as compared with the protection coil made up of only the air-core coil. For example, when the sum Lcsum of the self-inductance of each core coil 32 connected in series to the air-core coil 31 is four times the self-inductance La of the air-core coil 31, the loss W is reduced to ¹⁄₂₅ according to the equation (1) as compared with the structure where the protection coil is made up of only the air-core coil 31.

As shown in FIGS. 2 and 3, it may be preferable that the core coil 32 is disposed inside the air-core coil 31. This may allow the air-core coil 31 to be easily disposed, without an increase in area of the board 26, such that the outer diameter of the receiver coil 21 falls within the outer diameter of the air-core coil 31 as viewed from the circuit board 25 in the vertical direction. Note that when there is a space available for placing the core coil 32 outside the air-core coil 31 on the board 26, the core coil 32 may be disposed outside the air-core coil 31. Further, the core coil 32 may be disposed on a board different from the board 26 populated with the air-core coil 31. For example, the core coil 32 may be disposed on the circuit board 25. Furthermore, the direction of the center axis of the core coil 32 is not limited to a specific direction. For example, the core coil 32 is disposed to make its center axis approximately parallel with the center axis of the receiver coil 21. Alternatively, the core coil 32 may be disposed to make its center axis approximately orthogonal to the center axis of the receiver coil 21.

Figure 5A:
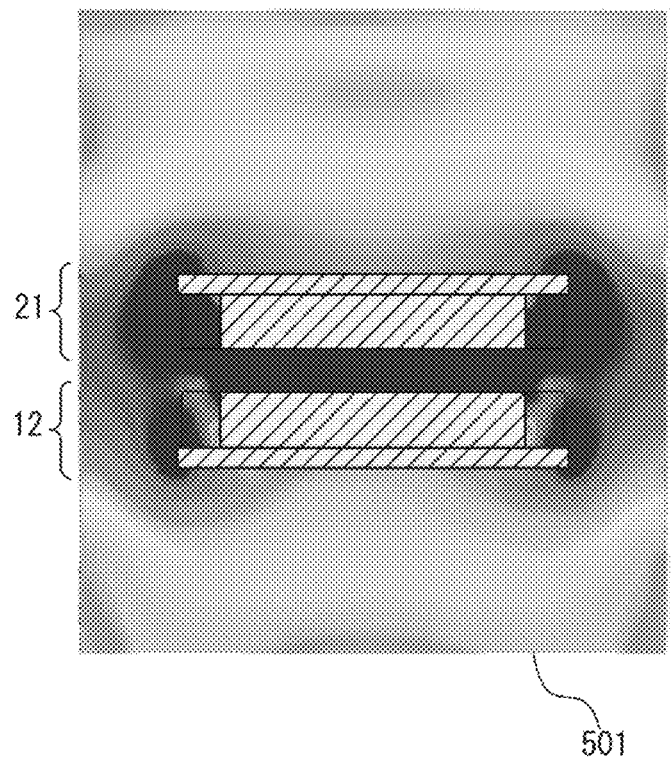
FIG. 5A is a diagram illustrating, as a comparative example, an example of a result of simulating a magnetic field created by a receiver coil in a structure where no protection coil is provided.
Figure 5B:
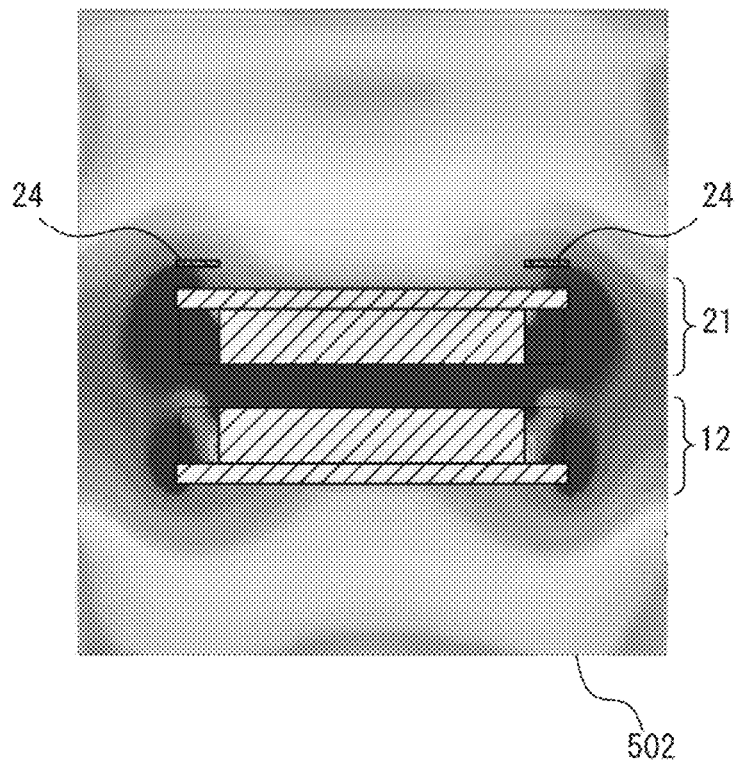
FIG. 5B is a diagram illustrating an example of a result of simulating a magnetic field created by a receiver coil according to one or more embodiments.

FIG. 5A is a diagram showing, as a comparative example, an example of a result of simulating a magnetic field created by the receiver coil in the structure where no protection coil is provided. FIG. 5B is a diagram showing an example of a result of simulating a magnetic field created by the receiver coil according to the embodiment. The darker in magnetic fields 501, 502 shown in FIGS. 5A and 5B, the higher the magnetic field intensity. Note that, in this simulation, the inductance of the transmitter coil 12 was set to 66 µH, the inductance of the receiver coil 21 was set to 220 µH, the capacitance of the resonance capacitor 22 was set to 16.5 nF, and the degree of coupling between the transmitter coil 12 and the receiver coil 21 was set to 0.67. Further, the voltage of the AC power applied to the transmitter coil 12 was set to 100 V, and the frequency of the AC power applied to the transmitter coil 12 was set to 85 kHz. Furthermore, the total inductance of the protection coil 24 was set to 3500 µH, the inductance of the air-core coil 31 was set to 500 µH, and the inductance of each of the two core coils 32 included in the protection coil 24 was set to 1500 µH. Then, the distance between the transmitter coil 12 and the receiver coil 21 was set to 10 mm, and the distance between the receiver coil 21 and the protection coil 24 was set to 5 mm.

As compared with the magnetic field 501 shown in FIG. 5A, it is shown that, in the magnetic field 502 shown in FIG. 5B, the magnetic field becomes weak on a side of the receiver coil 21 remote from the transmitter coil 12, in particular, at a position remote from the receiver coil 21 relative to the protection coil 24. It is thus shown that the magnetic flux travelling from the receiver coil 21 is cut off due to the presence of the protection coil 24.

Figure 6A:
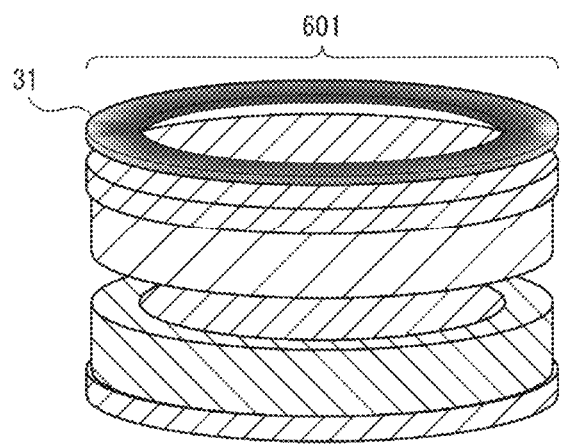
FIG. 6A is a diagram illustrating, as a comparative example, an example of a result of simulating density of a current flowing through a protection coil in a structure where a protection coil is made up of only an air-core coil.
Figure 6B:
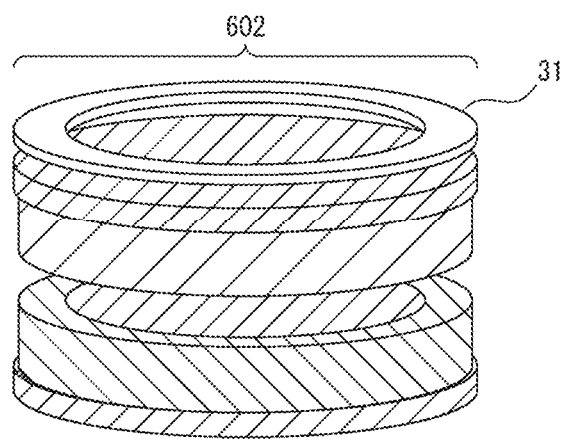
FIG. 6B is a diagram illustrating an example of a result of simulating density of a current flowing through a protection coil according to one or more embodiments.

FIG. 6A is a diagram showing, as a comparative example, an example of a result of simulating density of a current flowing through the air-core coil in the structure where the protection coil is made up of only the air-core coil. FIG. 6B is a diagram showing an example of a result of simulating density of a current flowing through the air-core coil according to the embodiment. Note that, in FIG. 6B, the core coil 32 is not shown. The darker in current density distributions 601, 602 shown in FIGS. 6A and 6B, the higher the current density. Note that conditions (inductance, degree of coupling, and the like of each coil) of this simulation were the same as the conditions of the simulation of the magnetic fields shown in FIGS. 5A and 5B.

As compared with the current density distribution 601 shown in FIG. 6A, it is shown that the density of the current flowing through the air-core coil 31 becomes low in the current density distribution 602 shown in FIG. 6B. It is thus shown that heat generation in the protection coil 24 due to the current flowing through the air-core coil 31 is reduced according to the embodiment.

As described above, the power receiver device of the non-contact power feeding device includes the protection coil between the receiver coil and the circuit board populated with the power receiver circuit, the protection coil being configured to cut off the magnetic flux travelling from the receiver coil. This allows the power receiver device to prevent the magnetic flux travelling from the receiver coil from reaching the circuit board. Furthermore, the protection coil includes the air-core coil formed of a wiring pattern of a conductor on a board different from the circuit board, and the core coil connected in series to the air-core coil. As described above, the non-contact power feeding device having a structure where the air-core coil is formed of a pattern on the board to avoid an increase in size of the protection coil, and the core coil is connected to the air-core coil allows the total self-inductance of the protection coil to be made larger so as to reduce a loss incurred in the protection coil.

According to a modification, the power transmitter device 2 may include, on a board disposed between the transmitter coil 12 and the circuit board populated with the power supply circuit 11, a protection coil similar to the protection coil of the power receiver device according to the above-described embodiment. In this structure, the power transmitter device 2 is another example of the power transfer device. Further, the transmitter coil 12 is another example of the power transfer coil, and the power supply circuit is another example of the power transmission and reception circuit. This allows the power transmitter device to prevent the magnetic flux travelling from the transmitter coil from reaching the circuit board populated with the power supply circuit.

As described above, those skilled in the art may make various modifications according to one or more embodiments within the scope.

DESCRIPTION OF SYMBOLS 1 non-contact power feeding device
2 power transmitter device
11 power supply circuit
12 transmitter coil
3 power receiver device
21 receiver coil
22 resonance capacitor
23 power receiver circuit
24 protection coil
25 circuit board
26 board
31 air-core coil
32 core coil

The invention claimed is:

1. A power transfer device comprising:
a power transfer coil configured to transfer power to another device in a non-contact manner;
a power transmission and reception circuit configured to supply power to the power transfer coil or to output power received by the power transfer coil to a load circuit; and
a protection coil disposed between the power transfer coil and the power transmission and reception circuit to prevent a magnetic flux generated by the power transfer coil from reaching the power transmission and reception circuit, wherein
the protection coil comprises
an air-core coil formed of a wiring pattern of a conductor provided on a board disposed between the power transfer coil and the power transmission and reception circuit, and
at least one core coil connected in series to the air-core coil.

2. The power transfer device according to claim 1, wherein
the at least one core coil is disposed inside the air-core coil wound on the board.

* * * * *